United States Patent [19]

Michiwaki

[11] Patent Number: 6,012,022
[45] Date of Patent: Jan. 4, 2000

[54] MEASURING AID SYSTEM

[75] Inventor: Hirokazu Michiwaki, Kanagawa, Japan

[73] Assignee: Mitutoyo Corporation, Kanagawa, Japan

[21] Appl. No.: 09/064,436

[22] Filed: Apr. 22, 1998

[30] Foreign Application Priority Data

Apr. 22, 1997 [JP] Japan .................................. 9-104440

[51] Int. Cl.$^7$ ............................ G01B 21/20; G06T 17/40
[52] U.S. Cl. .................... 702/168; 702/152; 364/468.04; 364/474.37; 345/420
[58] Field of Search ................................ 702/168, 83, 95, 702/150, 152; 364/474.23, 474.24, 474.35, 474.37, 191, 468.03, 468.04; 33/503, 556, 558; 345/420, 425

[56] References Cited

U.S. PATENT DOCUMENTS

| 5,198,990 | 3/1993 | Farzan et al. ............................. 364/560 |
| 5,257,204 | 10/1993 | Sawada et al. ..................... 364/474.24 |
| 5,278,983 | 1/1994 | Kawabe et al. .......................... 345/420 |
| 5,323,326 | 6/1994 | Saito et al. .......................... 364/474.24 |
| 5,351,196 | 9/1994 | Sowar et al. ....................... 364/468.04 |
| 5,412,762 | 5/1995 | Kondo ..................................... 395/120 |
| 5,649,076 | 7/1997 | Nishizaka et al. ................. 364/468.09 |
| 5,659,478 | 8/1997 | Pennisi et al. ..................... 364/468.04 |
| 5,864,482 | 1/1999 | Hazama et al. .................... 364/474.24 |

FOREIGN PATENT DOCUMENTS

| 3725347 | 7/1987 | Germany ....................... G01B 21/04 |
| 2274526 | 1/1994 | United Kingdom ............ G06F 15/46 |

*Primary Examiner*—Marc S. Hoff
*Assistant Examiner*—Bryan Bui
*Attorney, Agent, or Firm*—Webb Ziesenheim Logsdon Orkin & Hanson, P.C.

[57] ABSTRACT

A part program (measurement procedure) file 61 including definition information that defines the shape of a measurement object and measurement procedure information that defines a measurement procedure is read by a part program editing/executing section 62. The part program file 61 is used to control and edit a measuring apparatus. A solid modeler 65 generates solid models of the measurement object and a probe in a virtual space with the definition information and the measurement procedure information included in the part program file 61. The solid models are displayed on a displaying section 66. A measurement result can be displayed in the virtual space. With the measured result, a solid model can be generated. With the generated solid model, a part program file 61 is generated.

7 Claims, 7 Drawing Sheets

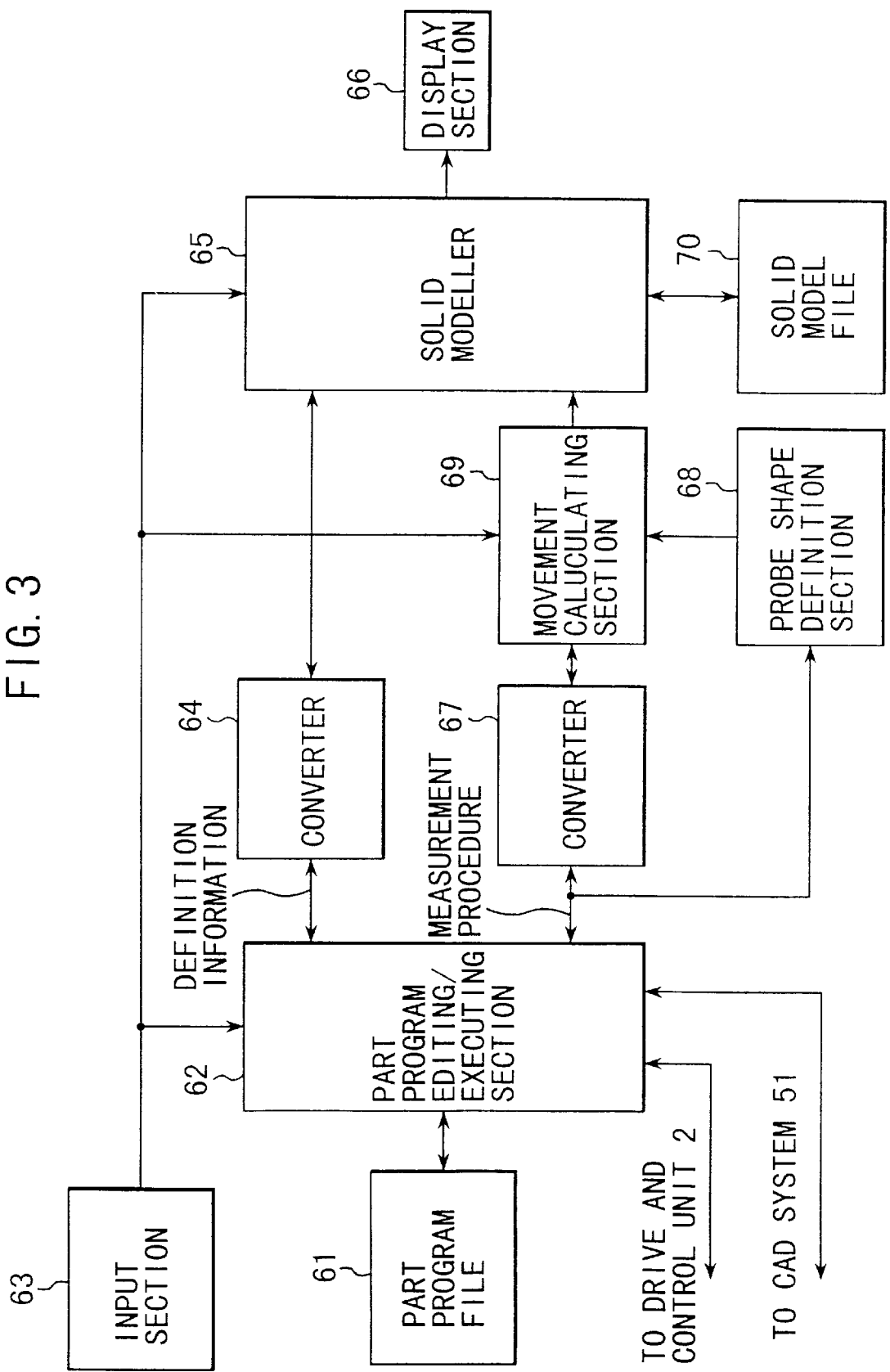

FIG. 4

```
F(PLANE1)=FEAT/PLANE, CART, 0, 0, 0, 0, 0, 1           ⎫  ⎫  ELEMENT
F(LINE1)=FEAT/LINE, BND, CART, 100, 0, 0, 100, 100, 0  ⎬  ⎪  DEFINITION
F(CIRCLE1)=FEAT/CIRCLE, INNER, CART, 10, 10, 5, 0, 0, 1, 4 ⎪
F(CYLNDR1)=FEAT/CYLNDR, INNER, CART, 50, 50, 0, 0, 0, 1, 4 ⎭  ⎪
                                                          ⎪  DEFINITION INFORMATION
F(BND1A)=FEAT/PLANE, CART, 0, 0, 0, -1, 0, 0           ⎫  ⎪
F(BND1B)=FEAT/PLANE, CART, 0, 0, 0, 0, -1, 0           ⎪  ⎪
F(BND1C)=FEAT/PLANE, CART, 100, 100, 0, 1, 0, 0        ⎪  ⎪
F(BND1D)=FEAT/PLANE, CART, 100, 100, 0, 0, 1, 0        ⎬  ⎪
F(BND2A)=FEAT/PLANE, CART, 0, 0, -20, 0, 0, 1          ⎪  ⎪
F(BND2B)=FEAT/PLANE, CART, 0, 0, 0, 0, 0, 1            ⎪  ⎪
BOUND/F(PLANE1), F(BND1A), F(BND1B), F(BND1C), F(BND1D)⎪  ⎪  BAUNDARY
BOUND/F(CYLNDR1), F(BND2A), F(BND2B)                   ⎭  ⎭  DEFINITION

MEAS/PLANE, F(PLANE1), 3                               ⎫
  GOTO/5, 5, 10                                        ⎪
  PTMEAS/CART, 5, 5, 0, 0, 0, 1                        ⎪
  PTMEAS/CART, 95, 5, 0, 0, 0, 1                       ⎪
  PTMEAS/CART, 5, 95, 0, 0, 0, 1                       ⎪
  GOTO/1, 99, 10                                       ⎪
ENDMES                                                 ⎪
MEAS/LINE, F(LINE1), 2                                 ⎪
  GOTO/110, 5, 10                                      ⎪
  PTMEAS/CART, 100, 5, -5, 1, 0, 0                     ⎪
  PTMEAS/CART, 100, 95, -5, 1, 0, 0                    ⎪
  GOTO/100, 95, 10                                     ⎪
ENDMES                                                 ⎪
MEAS/CIRCLE, F(CIRCLE1), 3                             ⎬  MEASUREMENT
  GOTO/10, 10, 10                                      ⎪  PROCEDURE
  PTMEAS/CART, 12, 10, 5, -1, 0, 0                     ⎪  INFORMATION
  PTMEAS/CART, 8, 10, 5, 1, 0, 0                       ⎪
  PTMEAS/CART, 10, 12, 5, 0, -1, 0                     ⎪
  GOTO/10, 10, 10                                      ⎪
ENDMES                                                 ⎪
MEAS/CYLNDR, F(CYLNDR1), 6                             ⎪
  GOTO/50, 50, 10                                      ⎪
  PTMEAS/CART, 52, 50, -10, -1, 0, 0                   ⎪
  PTMEAS/CART, 48, 50, -10, 1, 0, 0                    ⎪
  PTMEAS/CART, 50, 52, -10, 0, -1, 0                   ⎪
  PTMEAS/CART, 52, 50, -5, -1, 0, 0                    ⎪
  PTMEAS/CART, 48, 50, -5, 1, 0, 0                     ⎪
  PTMEAS/CART, 50, 52, -5, 0, -1, 0                    ⎪
  GOTO/50, 50, 10                                      ⎪
ENDMES                                                 ⎭

ENDFIL
```

MEASURING AID SYSTEM

BACKGROUND OF THE INVENTION

1. Field of the Invention

The present invention relates to a measuring aid system for causing a three-dimensional measuring apparatus, a picture measuring apparatus and so on to automatically measure a measurement object with a measurement procedure file (part program)

2. Prior Art

In a CNC (Computer Numerical Control) three-dimensional measuring apparatus, data such as a moving path, a moving speed, a moving direction vector of a probe, and a geometric shape of a measurement object has been written to a measurement procedure file such as a part program file. By executing the measurement procedure file, the three-dimensional measuring apparatus is controlled so as to automatically measure an object. There are two methods for creating a measurement procedure file.

As a first method, the three-dimensional measuring apparatus is actually operated by using a joystick (J/S) and operation panel for measuring a measurement object. By recording a measurement procedure during the actual measurement operation, a measurement procedure file is created. This method is referred to as playback method.

As a second method, a three-dimensional model of a measurement object is created by a computer with CAD (Computer Aided Design) data. The measurement procedure file is created by a measurement procedure teaching operation to the three-dimensional model on the computer. This method is referred to as CAT (Computer Aided Testing) system.

In each of such methods, the created measurement procedure file includes definition information (that defines the shape and position of a measurement object), probe information (that defines a probe for use), measurement procedure information (that defines the moving path, a measurement timing, and so forth of a probe), and various comment information. These information is written as character strings. Since a measurement procedure file is created and stored by a learn operation, the file can be repeatedly used for measuring the measurement object. When the object is to be measured according to a different procedure, measurement procedure information of a measurement procedure file is edited and stored as another file.

As is mentioned above, a measurement procedure file is repeatedly read and used or edited. When a particular measurement procedure file is selected for a particular measurement object, a measurement procedure file is selected with reference to the file name, definition information thereof, comment information, and so forth included in each file.

However, a file name, definition information, comment information, and so forth included in a measurement procedure file are composed of characters and numeric values. Thus, it is very difficult to look for a particular measurement object in such information. In reality, when measurement procedure files for measurement objects with similar shapes have been created, an improper measurement procedure file may be selected for a measurement object. In this event, a probe may interfere with a measurement object and thereby the machine and/or object may be damaged.

When a measurement procedure file has to be modified so as to omit part of a measurement procedure or to measure only a particular measurement portion of a measurement object, a corresponding portion has to be searched and modified in the file which is represented in text format. Thereafter, the modified file has to be stored with another name.

In such a measurement procedure file, measurement results are overwritten to the original file as character strings. To recognize a measurement position, numeric data as character strings must be troublesomely checked.

SUMMARY OF THE INVENTION

An object of the present invention is to provide a measuring aid system that allows the content of a measurement procedure file to be easily checked and a desired measurement procedure file to be easily selected.

Another object of the present invention is to provide a measuring aid system that allows a measurement procedure file to be easily edited.

A further object of the present invention is to provide a measuring aid system that allows a measuring operation to be easily performed with a measurement procedure file.

A first aspect of the present invention is a measuring aid system for use with a measuring system for automatically measuring a measurement object corresponding to a measurement procedure file, comprising a measurement procedure executing means for reading a measurement procedure file including definition information and measurement procedure information and controlling a measuring apparatus with the measurement procedure information, the definition information defining the shape of a measurement object, the measurement procedure information defining a measurement procedure, a solid modeler for generating a solid model of the measurement object in a virtual space with the definition information of the measurement object in the measurement procedure file, and a displaying means for displaying the solid model generated by the solid modeler.

A second aspect of the present invention is a measuring aid system for use with a measuring system for automatically measuring a measurement object corresponding to a measurement procedure file, comprising a solid modeler for generating a solid model in a virtual space with a measured result of the measurement object, a displaying means for displaying the solid model generated by the solid modeler, and a measurement procedure creating means for creating definition information that defines the shape of the measurement object of the measurement procedure file with the generated solid model.

A third aspect of the present invention is a measuring system, comprising a measuring apparatus for measuring a measurement object, a drive and control unit for driving and controlling the measuring apparatus and obtaining required measured values from the measuring apparatus, an operation panel for operating the measuring apparatus through the drive and control unit, and a host system for executing a part program that causes the drive and control unit to drive and control the measuring apparatus, wherein the part program includes definition information and measurement procedure information, the definition information defining the shape of the measurement object, the measurement procedure information defining the measurement procedure, and wherein the host system comprises an inputting section for inputting information necessary for editing the part program, a part program editing/executing section for receiving a part program to be edited, executing the part program, and editing the part program with information that is input from the inputting section, a solid modeler for generating a solid model of the measurement object in a virtual space with definition information that defines the shape of the measurement object, the definition information being included in the part program, and a displaying means for displaying a solid model generated by the solid modeler.

According to the present invention, only definition information that defines the shape of a measurement object is extracted from a measurement procedure file that has been created. With the definition information, a solid model of the measurement object is generated and displayed. Thus, the shape of the measurement object can be visually recognized. Consequently, a measurement procedure file of an incorrect measurement object can be effectively prevented from being selected.

In one preferred mode, a measuring aid system according to the invention further comprises a moving calculating means for calculating a measurement path in accordance with the measurement procedure information, the displaying means displays the measurement path along with the solid model of the measurement object, thereby the measurement path can be visually obtained. Consequently, an improper measurement procedure file can be prevented from being selected from several different files for the same measurement object.

In another preferred mode, the solid modeler generates a solid model of a probe for use in a virtual space with measurement procedure information and the displaying means displays the solid model of the probe. Thereby a simulation for moving the probe in the moving path can be performed. In this case, an interference between the probe and the measurement object can be easily checked.

In another preferred mode, a measuring aid system according to the invention further comprises an inputting means for changing a measurement path calculated by the moving calculating means and displayed on the displaying means and a measurement procedure editing means for rewriting the measurement procedure information of the measurement procedure file. Thereby an existing measurement procedure file can be easily edited so as to create another measurement procedure file. In addition, without need to create a new file, by changing a measurement path of an existing file, various measuring operations can be easily performed.

A measured result can be displayed in a virtual space. With the measured result, a solid model can be generated. With the generated solid model, a measurement procedure file can be created. Thus, a measuring aid system effective for general measuring operations can be accomplished.

BRIEF DESCRIPTION OF DRAWINGS

The invention is described further, by way of example, with reference to the accompanying drawings in which:

FIG. 3 is a functional block diagram showing a host system in the three-dimensional measuring system according to the embodiment of the present invention;

FIG. 4 is a coding list of an example of a part program used in the three-dimensional measuring system according to the embodiment of the present invention;

DETAILED DESCRIPTION OF THE PREFERRED EMBODIMENT

A three-dimensional measuring system according to an embodiment of the present invention will be described below with reference to the accompanying drawings.

Figure 1:
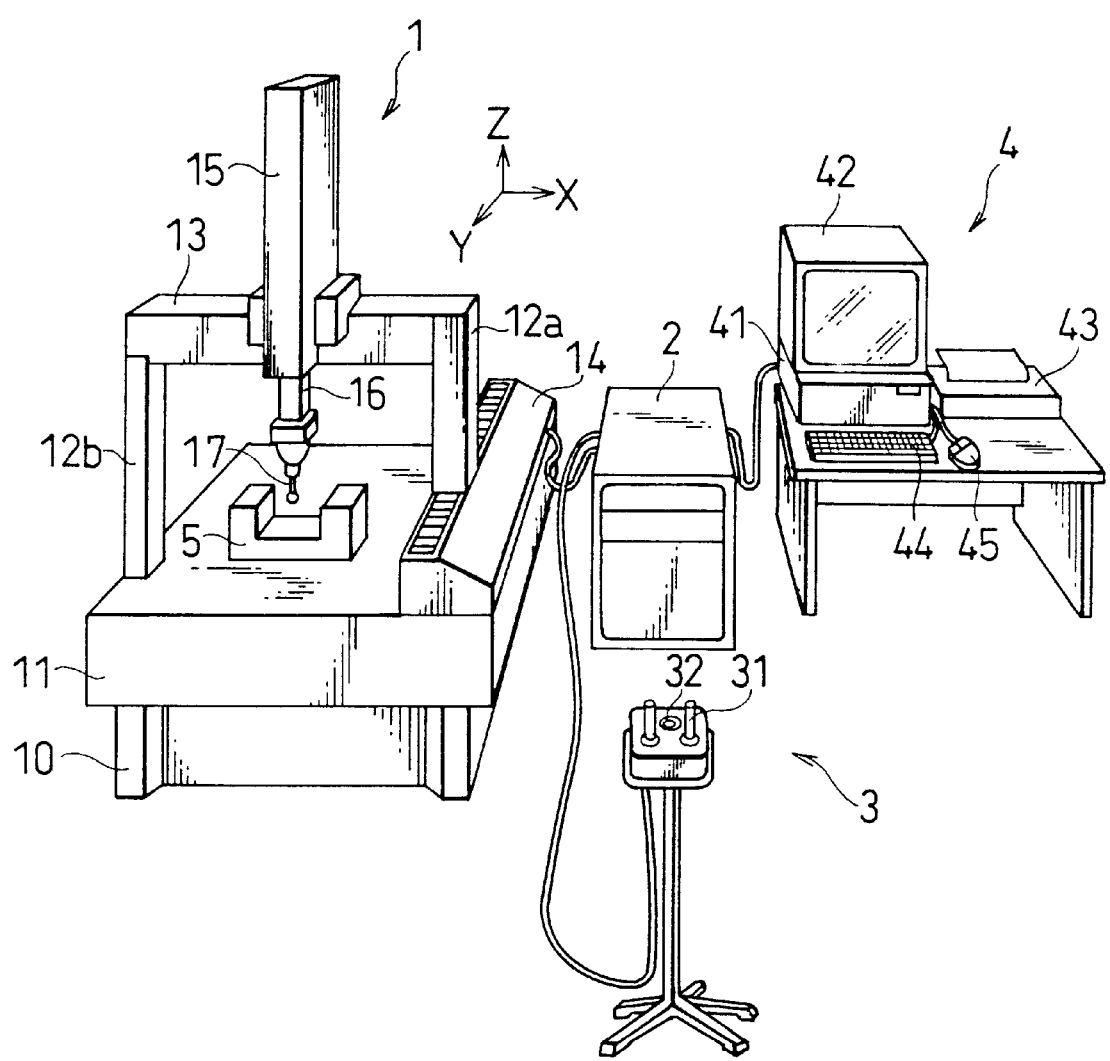
FIG. 1 is a perspective view showing a three-dimensional measuring system according to an embodiment of the present invention.

FIG. 1 is a perspective view showing an outlined structure of the three-dimensional measuring system.

The three-dimensional measuring system comprises a three-dimensional measuring apparatus 1, a drive and control unit 2, a joystick (J/S) and operation panel 3, and a host system 4. The drive and control unit 2 drives and controls the three-dimensional measuring apparatus 1 and obtains required measured values from the three-dimensional measuring apparatus 1. The joystick (J/S) and operation panel 3 is used to manually operate the three-dimensional measuring apparatus 1 through the drive and control unit 2. The host system 4 has a function for editing and executing a part program that defines a measurement procedure of the drive and control unit 2. In addition, the host system 4 has a function for calculating a geographic shape corresponding to measured coordinate values obtained through the drive and control unit 2. Moreover, the host system 4 has a function for recording and transmitting a part program.

The three-dimensional measuring apparatus 1 is structured as follows. A base board 11 is disposed on a vibration removing table 10 in such a manner that the upper surface of the base board 11 as a base surface matches a horizontal plane. Ann support members 12a and 12b that vertically extend from both edges of the base board 11 hold an X axis guide 13. The arm support member 12a is moved in the direction of the Y axis by a Y axis driving mechanism 14 connected to the lower edge of the arm support member 12a. The lower edge of the arm support member 12b is held by an air bearing so that the arm support member 12b is moved in the direction of the Y axis. A Z axis guide 15 that vertically extends is moved in the direction of the X axis along the X axis guide 13. A Z axis arm 16 is disposed in the Z axis guide 15 so that the Z axis arm 16 is moved along the Z axis guide 15. A contact type probe 17 is disposed at the lower edge of the Z axis arm 16. When the probe 17 contacts a workpiece 5 disposed on the base board 11, the probe 17 outputs a touch signal to the drive and control unit 2. The drive and control unit 2 obtains XYZ coordinate representing the position on the workpiece contacted by the probe at the time the probe outputs the touch signal.

The J/S and operation panel 3 has joysticks 31 and a coordinate input switch 32. The joysticks 31 are used to manually drive the probe 17 of the three-dimensional measuring apparatus 1 in the XYZ directions. The coordinate input switch 33 is used so that the XYZ coordinate values of the current position of the probe 17 are input to the drive and control unit 2.

The host system 4 comprises a host computer 41, a display unit 42, a printer 43, a keyboard 44, and a mouse 45 and so on.

Figure 2:
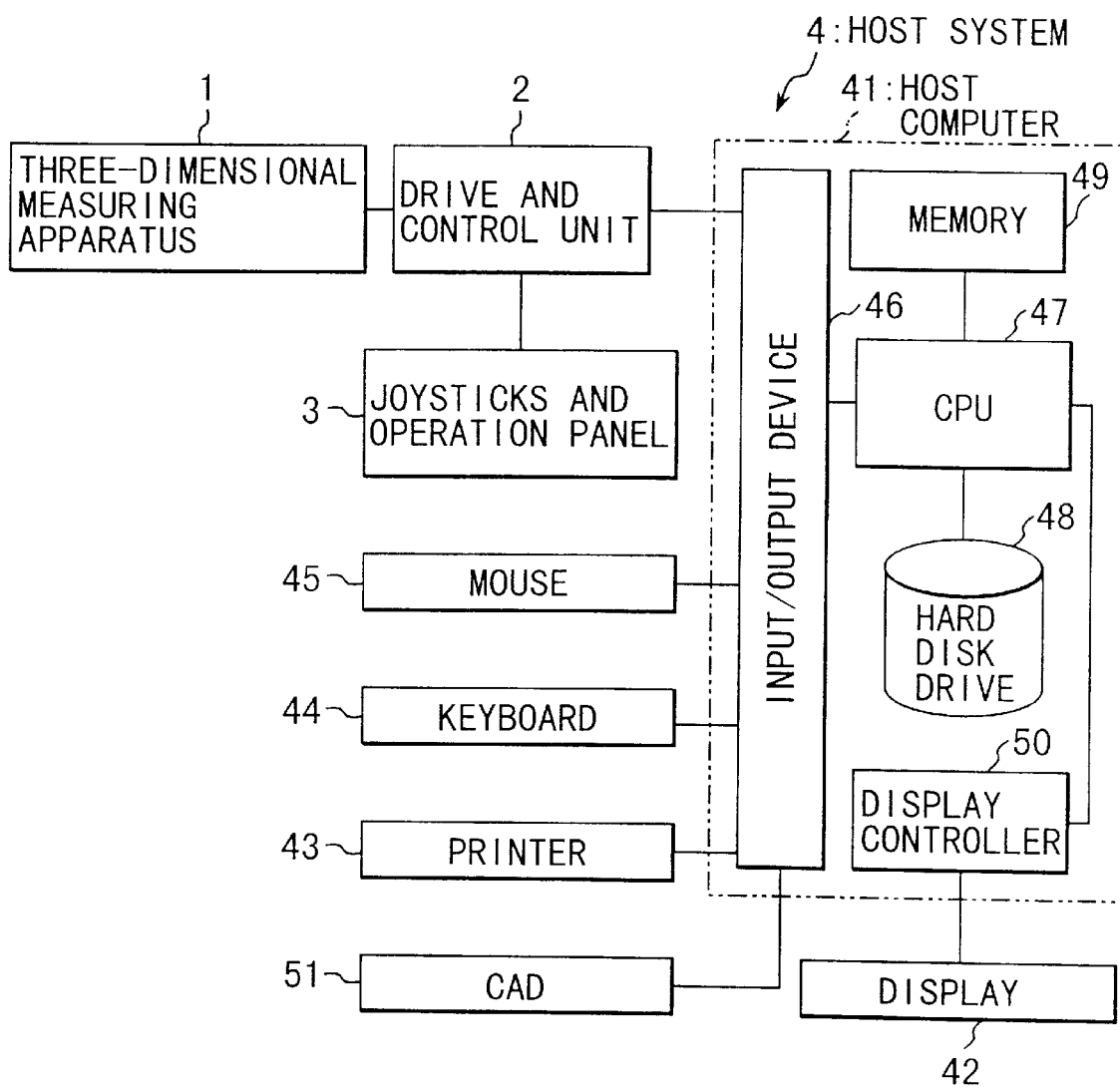
FIG. 2 is a block diagram showing the three-dimensional measuring system according to the embodiment of the present invention.

FIG. 2 is a block diagram showing the structure of the three-dimensional measuring system according to the embodiment of the present invention. The drive and control unit 2, the printer 43, the keyboard 44, and the mouse 45 are connected to a CPU 47 through an input/output device 46 of the host computer 41. A hard disk 48 and a memory 49 are connected to the CPU 47. In addition, the CPU 47 is connected to the display unit 42 through a display controller 50. A CAD system 51 is connected to the host computer 41 so that the host computer 41 creates a part program corresponding to design data and sends measured results to the CAD system 51. The hard disk 48 stores part program files, program files for editing/executing part program files, and other files. The measuring aid system according to the present invention is composed of these files and hardware of the host system 4.

FIG. 3 is a functional block diagram showing the structure of the measuring aid system.

The measuring aid system displays a three-dimensional model of a measurement object with a part program that has been created so that the shape of the object can be easily checked. In addition, the measuring aid system displays a measurement route, a probe, and so forth so as to aid the editing operation of the measurement procedure and the measuring operation.

The part program file 61 is a file written in DMIS (Dimensional Measuring Interface Standard) language specification as shown in FIG. 4. The DMIS language is a language specification that has been developed for exchanging data between a CAD and a three-dimensional measuring apparatus. The CAD system sends definition information of geographic shapes created as designed values and information of a measurement path (a moving path of a probe) to the three-dimensional measuring apparatus. The three-dimensional measuring apparatus overwrites the measured results to a part program file in the DMIS language and sends back the resultant file to the CAD system. According to the preferred mode of the present invention, a measurement procedure file can be preferably written in the DMIS language. However, as long as a measurement procedure file includes definition information of a measurement object, the file may be created in other than the DMIS language.

The part program file 61 includes definition information that defines a geometric shape of a measurement object in a three-dimensional space and measurement procedure information that defines the approaching direction against the defined geographic shape for obtaining coordinate values of measured points. In the case of that the measurement object is a sphere, the center coordinate value and the radius of the sphere are defined (as definition information) in the part program file. Information of a measurement procedure may be written in the part program file so that the center of a tip sphere of the probe is slowly moved from a point indicated with a coordinate value (x1, y1, z1) to the measurement object in the direction indicated with a directional vector (1, m, n) at a predetermined speed (for example, 3 mm/s) until the center of the tip sphere of the probe contacts the sphere, and so that this procedure is repeated for four points in different directions and from different positions.

Figure 5:
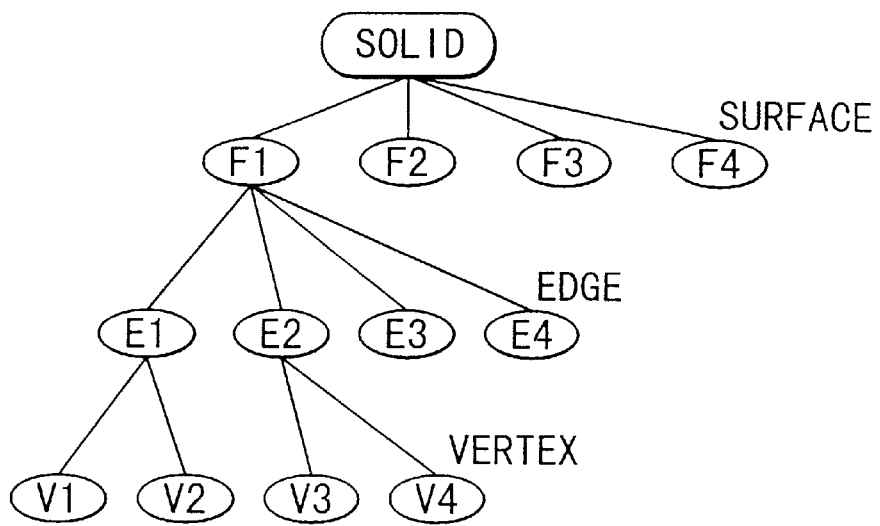
FIG. 5 is a schematic diagram for explaining a boundary representing method of a solid model of the three-dimensional measuring system according to the embodiment of the present invention.
Figure 6:
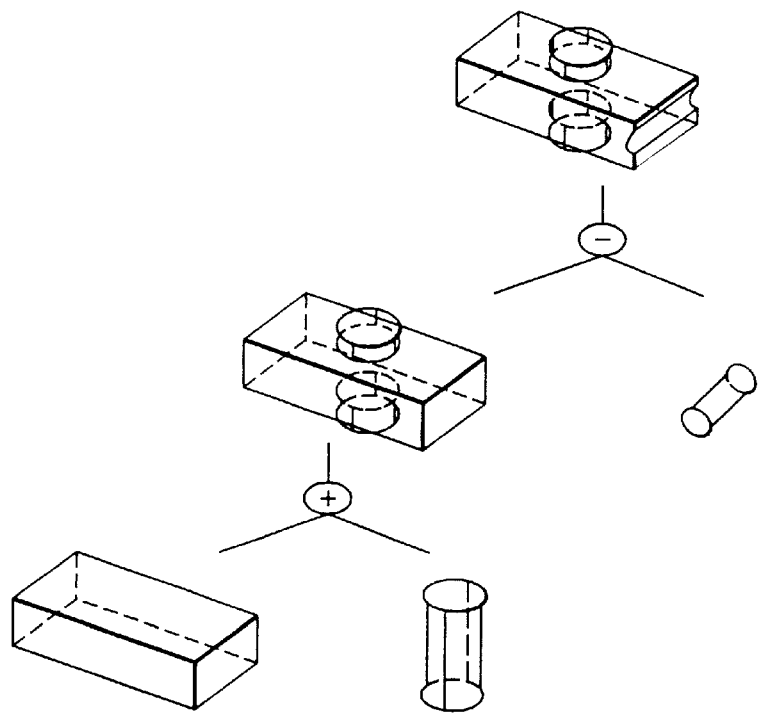
FIG. 6 is a schematic diagram for explaining CGS method for a solid model in the three-dimensional measuring system according to the embodiment of the present invention.
Figure 7:
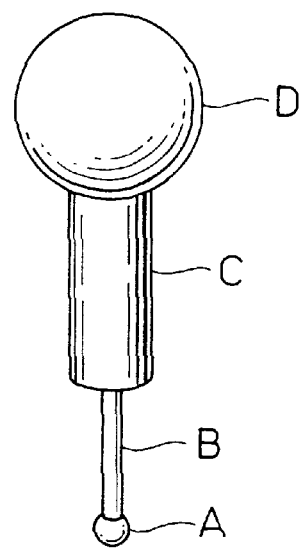
FIG. 7 is a schematic diagram showing an example of a solid model of a probe represented in the CGS method.

As definition information for representing a solid model, representation methods such as a boundary representation method, a CSG (Constructive Solid Geometry) representation method, and a hybrid type method that is a combination of the boundary representation method and the CGS representation method are known. As shown in FIG. 5, in the boundary representation method, a solid model is defined with a boundary surface, an edge of the surface, coordinate values of a vertex of the edge, and so forth. The boundary representation method can be used for any complicated shapes. On the other hand, as shown in FIG. 6, in the CGS representation method, a solid model is defined in the manner of that previously defined plural solid elements are assembled by set calculations. Thus, the CGS representation method has the advantage of that data structure can be simplified. A probe shown in FIG. 7 is represented in the CGS representation method as follows.

(1) Top sphere A: Shape=sphere; Inside of the shape is filled with material; Center coordinates=(0, 0, 0); Radius=1.5 mm (2) Stylus B: Shape=cylinder; Inside of the shape is filled with material; Center axis vector (0, 0, 1); Radius=1 mm; Lower point coordinates (0, 0, 1.5); Upper point coordinates (0, 0, 26.5)

(3) Detecting portion C: Shape=Cylinder; Inside of the shape is filled with material; Center axis vector (0, 0, 1); Radius=6 mm; Lower point coordinates (0, 0, 26.5); Upper point coordinates (0, 0, 66.5)

(4) Head portion D: Shape=sphere; Inside of the shape is filled with material; Center coordinates (0, 0, 91.5); Radius=25 mm (5) Shape of the probe=(1)+(2)+(3)+(4)

In the example shown in FIG. 4, a solid model is represented in the hybrid type method. Definition information comprises element definition information and boundary definition information.

A part program editing/executing section 62 has a controlling function for reading a part program file 61 and controlling the drive and control unit 2 with measurement procedure information of the file 61, an overwriting function for overwriting a measured result to the part program file 61, a definition information generating function for generating definition information with design data received from the CAD system 51, and an editing function for editing the part program file 61 with input information that is input by a keyboard 44 and a mouse 45 as an input section 63. A converter 64 has a conversion function for extracting only definition information from the part program, converting the definition information into data corresponding to interface specification of a solid modeler 65, and supplying the converted data to the solid modeler 65 and a reverse conversion function for generating definition information of a part program with a solid model created by the sold modeler 65. The solid modeler 65 generates a solid model in a virtual space with definition information in the boundary representation method/CGS representation method. The generated solid model is supplied so as to display to the display controller 50 and a display section 66 as the display unit 42.

On the other hand, a converter 67 has a conversion function for extracting measurement procedure information from the part program read by the part program editing/executing section 62 and converting the measurement procedure information into a sequence of coordinate values of a moving path of the probe 17 and a reverse conversion function for reversely converting a measurement path calculated by a movement calculating section 69 into measurement procedure information of a part program. Probe definition information of the measurement procedure is supplied to a probe shape definition section 68. The probe shape definition section 68 defines a solid model of a probe in such as the CGS representation method. A movement calculating section 69 moves a solid model of a probe defined by the probe shape definition section 68 in the virtual space with the sequence of coordinate values received from the converter 67 and supplies information of the moved solid model to the solid modeler 65. In addition, the movement calculating section 69 changes a moving path of a probe with information of the moving path received from the input section 63.

Figure 8:
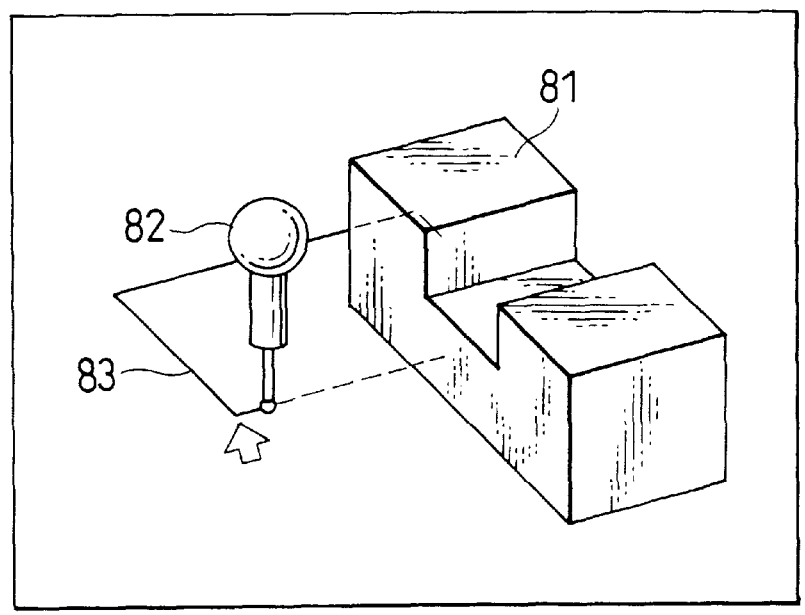
FIG. 8 is a schematic diagram showing an example of a solid model displayed with the three-dimensional measuring system according to the embodiment of the present invention.

Thus, as shown in FIG. 8, the display section 66 displays a process of which a solid model 82 of the probe is moved against a solid model of a measurement object on real time basis. In addition, the display section 66 displays a process of which a measurement path 83 is changed. Information of a solid model supplied to the solid modeler 65 is stored as a solid model file 70. For easy management, the solid model file 70 and the part program file 61 can be handled as one common file.

Figure 9:
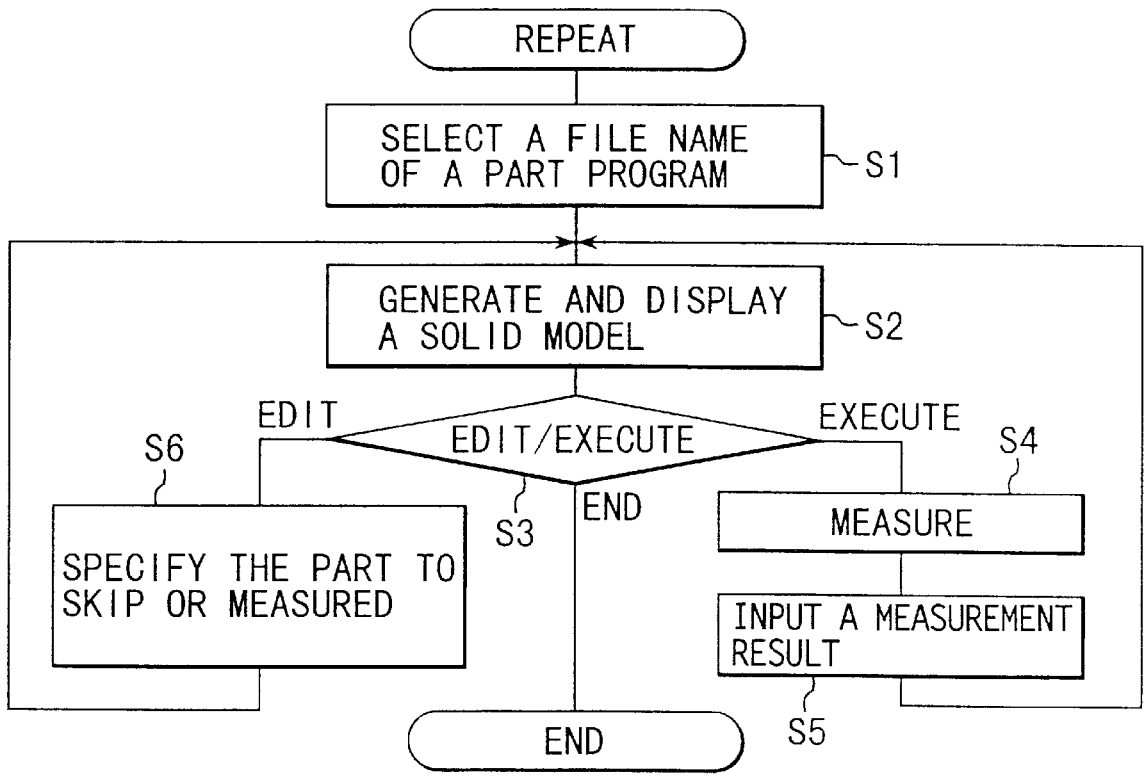
FIG. 9 is a flow chart showing an executing/editing process of a part program in the three-dimensional measuring system according to the embodiment of the present invention.

FIG. 9 is a flow chart showing a process for executing/editing a part program with the measuring aid system according to the present invention.

A file name of a part program to be executed/edited is selected (at step S1). The solid modeler 65 generates sold models of a measurement object and a probe with definition information and measurement procedure information of the selected part program. The created solid models are displayed on the display section 66 (at step S2). When an executing command is issued (at step S3), the selected part program is executed and thereby a measuring operation is started (at step S4). The measured result is supplied to the solid modeler 65 (at step S5). The measured result is displayed on the display section 66 on real time basis. When an editing command is issued (at step S3), the designated portion is skipped or measured (at step S6) and the resultant data is displayed on the display section 66.

Thus, while the measuring operation is being performed, a particular measurement portion can be skipped and another measurement portion can be designated with reference to a solid model displayed on real time basis.

Figure 10:
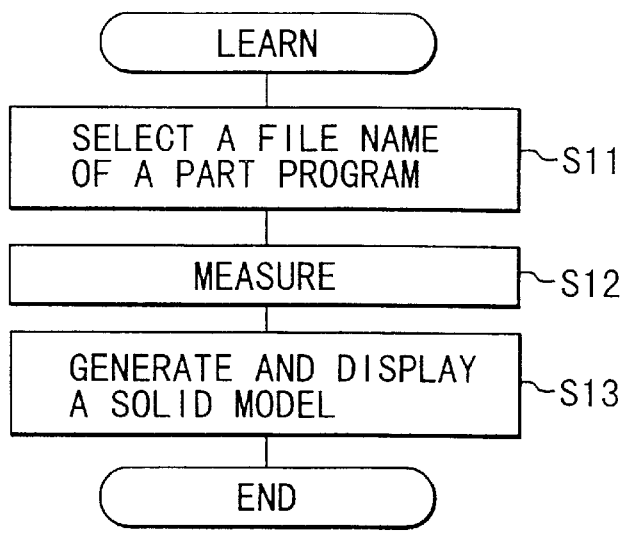
FIG. 10 is a flow chart showing a part program creating procedure in the three-dimensional measuring system according to the embodiment of the present invention.

FIG. 10 is a flow chart showing a process for creating a part program with the measuring aid system according to the present invention.

First, a part program name is designated (at step S11). With the J/S and operation panel 3, the measuring operation is started (at step S12). The obtained measuring path and measured values are successively supplied to the solid modeler 65. Thus, a solid model is created and displayed (at step S13). At this point, the part program editing/executing section 62 successively creates a part program in accordance with converted data for the solid model by the reverse conversion function of the converters 64 and 67.

Thus, an optimum measurement procedure file can be created while a measurement portion is being visually checked through a real measuring operation.

As described above, according to the present invention, only definition information that defines the shape of a measurement object is extracted from a measurement procedure file that has been created. With the definition information, a solid model of the measurement object is generated and displayed. With the measured result, a solid model is generated and a measurement procedure file is created. Thus, while data is being visually checked, the measuring operation can be performed. Thus, a measuring aid system effective for general measuring operations can be accomplished.

The entire disclosure of Japanese Patent Application No. 9-104440 filed on Apr. 22, 1997 including specification, claims, drawings and summary are incorporated herein by reference in its entirety.

What is claimed is:

1. A measuring aid system for use with a measuring system for automatically measuring a measurement object corresponding to a measurement procedure file, comprising:

measurement procedure executing means for reading a measurement procedure file including definition information and measurement procedure information and controlling a measuring apparatus according to the measurement procedure information, the definition information defining the shape of a measurement object, the measurement procedure information defining a measurement procedure;

a solid modeler for generating a solid model of the measurement object in a virtual space according to the definition information of the measurement object in the measurement procedure file;

movement calculating means for calculating a measuring path according to the measurement procedure information;

displaying means for displaying the solid model generated by said solid modeler and a measuring path in the virtual space according to a calculated result of said movement calculating means;

inputting means for inputting information necessary for changing of the measuring path obtained by said movement calculating means and displayed on said displaying means; and measurement procedure editing means for rewriting the measurement procedure information of the measurement procedure file corresponding to the measuring path changed by said inputting means.

2. The measuring aid system as set forth in claim 1, wherein said solid modeler generates a solid model of a probe for use in the virtual space according to the measurement procedure information, and wherein said displaying means displays the solid model of the probe generated by said solid modeler.

3. A measuring aid system for use with a measuring system for automatically measuring a measurement object corresponding to a measurement procedure file which includes measurement procedure information, comprising:

a solid modeler for generating a solid model in a virtual space according to a measured result of the measurement object;

measurement procedure creating means for creating definition information that defines the shape of the measurement object of the measurement procedure file according to the generated solid model;

movement calculating means for calculating a measuring path according to the measurement procedure information;

displaying means for displaying the solid model generated by said solid modeler and a measuring path in the virtual space according to a calculated result of said movement calculating means;

inputting means for inputting information necessary for changing of the measuring path obtained by said movement calculating means and displayed on said displaying means; and measurement procedure editing means for rewriting the measurement procedure information of the measurement procedure file corresponding to the measuring path changed by said inputting means.

4. The measuring aid system as set forth in claim 3, wherein said solid modeler generates a solid model of a probe for use in the virtual space according to the measurement procedure information, and wherein said displaying means displays the solid model of the probe generated by said solid modeler.

5. A measuring system, comprising:

a measuring apparatus for measuring a measurement object;

a drive and control unit for driving and controlling said measuring apparatus and obtaining required measured values from said measuring apparatus;

an operation panel for operating said measuring apparatus through said drive and control unit; and a host system for executing a part program that causes said drive and control unit to drive and control said measuring apparatus, wherein the part program includes definition information and measurement procedure information, the definition information defining the shape of the measurement object, the measurement procedure information defining the measurement procedure, and wherein said host system comprises:

an inputting section for inputting information from said measuring apparatus necessary for editing the part program;

a part program editing/executing section for receiving a part program to be edited, executing the part program, and editing the part program according to information that is input from said inputting section;

a solid modeler for generating a solid model of the measurement object in a virtual space according to definition information that defines the shape of the measurement object, the definition information being included in the part program; and displaying means for displaying a solid model generated by said solid modeler.

6. The measuring system as set forth in claim 5, wherein said host system obtains design data of the measurement object from an external CAD system and generates definition information of the measurement object according to the design data.

7. The measuring system as set forth in claim 5, wherein said host system further comprises:

a measurement path calculating section for calculating a measurement path of said measuring apparatus according to the measurement procedure information included in the part program, and wherein said displaying unit displays the measurement path calculated by said measurement path calculating section and the solid model at a time.

* * * * *